(12) United States Patent
Julian et al.

(10) Patent No.: US 8,306,520 B2
(45) Date of Patent: Nov. 6, 2012

(54) INTER-SECTOR CONTROL CHANNEL TRANSMISSION

(75) Inventors: David Jonathan Julian, San Diego, CA (US); Dhananjay Ashok Gore, Karnataka (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/252,787

(22) Filed: Oct. 4, 2011

(65) Prior Publication Data

US 2012/0026959 A1    Feb. 2, 2012

Related U.S. Application Data

(62) Division of application No. 12/199,413, filed on Aug. 27, 2008, now Pat. No. 8,060,099.

(51) Int. Cl.
    *H04W 88/02*    (2009.01)
(52) U.S. Cl. ........................ 455/418; 455/443
(58) Field of Classification Search .................. 455/418, 455/226.1; 370/252, 329; 375/359
    See application file for complete search history.

(56) References Cited

U.S. PATENT DOCUMENTS

| | | | |
|---|---|---|---|
| 5,691,974 A | 11/1997 | Zehavi et al. | |
| 5,794,157 A | 8/1998 | Haartsen | |
| 7,626,920 B2 | 12/2009 | Grindahl et al. | |
| 7,633,893 B2 | 12/2009 | Grindahl et al. | |
| 2004/0190482 A1 | 9/2004 | Baum et al. | |
| 2005/0281243 A1* | 12/2005 | Horn et al. | 370/345 |
| 2006/0215559 A1* | 9/2006 | Mese et al. | 370/232 |
| 2006/0285503 A1 | 12/2006 | Mese et al. | |
| 2007/0104164 A1* | 5/2007 | Laroia et al. | 370/338 |
| 2007/0117538 A1 | 5/2007 | Weiser et al. | |
| 2007/0124368 A1 | 5/2007 | Weiser et al. | |
| 2007/0136132 A1 | 6/2007 | Weiser et al. | |
| 2008/0056387 A1* | 3/2008 | Sakar et al. | 375/240.27 |
| 2009/0052674 A1* | 2/2009 | Nishida et al. | 380/278 |
| 2011/0072162 A1* | 3/2011 | Rysavy | 710/5 |

FOREIGN PATENT DOCUMENTS

| | | |
|---|---|---|
| EP | 1855434 A1 | 11/2007 |
| EP | 1855502 A1 | 11/2007 |
| WO | WO2006099546 A1 | 9/2006 |

OTHER PUBLICATIONS

3GPP: "Physical Layer for Ultra Mobile Broadband (UMB) Air Interface Specification" 3rd Generation Artnership Project (3GPP); Technical Specification (TS),, Apr. 5, 2007, page Complete, XP007905179 p. 2-3, lines 25, 30 p. 2-21, main table p. 2-48, lines 1-2 Figure 2.8.1.4-1 p. 2-80, lines 8-14 p. 2-82, lines 23-28 p. 4-32, lines 9-16Paragraph 2.14 Paragraph 2.15.

(Continued)

*Primary Examiner* — Diane Mizrahi
(74) *Attorney, Agent, or Firm* — Donald C. Kordich

(57) ABSTRACT

Provided is a more efficient manner of transmitting a control message to reach into a neighboring sector (e.g., inter-sector) of a wireless network environment. The control message can be utilized for purposes such as handoff, indicating an amount of interference, inter-sector power control for managing inter-sector interference, sector loading, or other control messages. The control message can be placed on a set of resources utilizing planned reuse and/or statistical reuse. Statistical reuse includes selecting a subcarrier set for carrying the control message. According to some aspects, the control message can be sent over a backhaul channel.

24 Claims, 14 Drawing Sheets

OTHER PUBLICATIONS

European Search Report—EP12151779—Search Authority—Munich—Feb. 27, 2012.
International Search Report & Written Opinion—PCT/US2009/055179—International Search Authority—European Patent Office—Apr. 27, 2010.
Michael Wang, et al., "Preamble Design in Ultra Mobile Broadband Communication Systems" IEEE International Workshop on Signal Design and its Applications in Communications, Sep. 23, 2007, pp. 328-333.
Wang et al., "Channelization in Ultra Mobile Broadband Communication Systems: The Forward Link", International Wireless Communications and Mobile Computing Conference (IWCMC), Aug. 6, 2008, pp. 614-620, IEEE, XP031306997, ISBN: 978-1-4244-2201-2.
Wang, et al., "Interference Management and Handoff Techniques in Ultra Mobile Broadband Communication Systems" IEEE International Symposium Onspread Spectrum Techniques and Applications, Aug. 25, 2008, pp. 166-172, XP031319003.
Yuefeng Zhou et al: "Simulation Study of Fractional Frequency Reuse for Mobile WiMAX" Vehicular Technology Conference, 2008. VTC Spring 2008. IEEE, IEEE, Piscataway, NJ, USA, May 11, 2008, pp. 2592-2595, XP031256033 ISBN: 978-1-4244-1644-8 Sections I and II.

\* cited by examiner

INTER-SECTOR CONTROL CHANNEL TRANSMISSION

CLAIM OF PRIORITY UNDER 35 U.S.C. §120

The present Application for Patent is a Divisional of patent application Ser. No. 12/199,413 entitled "INTER-SECTOR CONTROL CHANNEL TRANSMISSION" filed Aug. 27, 2008, allowed which issued as U.S. Pat. No. 8,060,099 on Nov. 15, 2011, and assigned to the assignee hereof and hereby expressly incorporated by reference herein.

BACKGROUND

I. Field

The following description relates generally to wireless communication systems and more particularly to transmission of inter-sector control channels.

II. Background

Wireless communication systems are deployed to provide a multitude of communication services such as voice, video, packet data, broadcast, and messaging services as well as others. These systems can be multiple-access systems capable of supporting communication for a number of terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, as well as other systems.

Wireless multiple-access communication systems can simultaneously support communication for multiple wireless terminals. In such systems, each terminal can communicate with one or more sectors through transmissions on the forward and reverse links. The forward link (or downlink) refers to the communication link from the sectors to the terminals, and the reverse link (or uplink) refers to the communication link from the terminals to the sectors. These communication links can be established through a single-in-single-out (SISO), multiple-in-single-out (MISO), and/or multiple-in-multiple-out (MIMO) systems.

Multiple terminals can simultaneously transmit on the reverse link by multiplexing their transmissions to be orthogonal to one another in the time, frequency, and/or code domain. If complete orthogonality between transmissions is achieved, transmissions from each terminal do not interfere with transmissions from other terminals at a receiving sector. However, complete orthogonality among transmissions from different terminals is often not realized due to channel conditions, receiver imperfections, as well as other factors (e.g., overhead/difficulty of a frequency planned reuse). As a result, terminals often cause some amount of interference to other terminals. Furthermore, because transmissions from terminals communicating with different sectors are typically not orthogonal to one another, each terminal can also cause interference to terminals communicating with nearby sectors. This leads to a need to control the interference caused at a base station by terminals in other sectors.

In some systems, the entire allocated channel bandwidth is utilized in every sector, which is referred to as a frequency reuse of one. Frequency reuse indicates the rate at which the same frequency can be used in the network. A frequency reuse of one creates a challenge for inter-sector control messages that target users in adjacent sectors. These control messages can be interference control messages, handoff messages, and/or other messages. A frequency reuse of one can provide a low signal-to-interference ratio (SIR), such as −15 dB, −20 dB, −30 db, or lower, for example; particularly for users in adjacent sectors. However, the data might only be received by a subset of all mobile devices that should have the information (e.g., edge devices, devices close to the adjacent sector transmitting base station), since the serving sector base station received power is much greater than the adjacent sector base station received power due to the closer RF proximity. This creates a challenge for transmitting control messages to users in adjacent sectors. If, for example, users in adjacent sectors are creating too much interference on the reverse link of a specific base station, then that base station may want to signal to users to backoff their transmit powers. However, with a reuse of one, only the edge users in the adjacent sector may be able to receive the power backoff control message since users deeper into the sector will experience too much interference from their serving base station. The edge mobile devices that receive the data might overcompensate for devices that do not receive the message, further the users that do not receive the message may continue transmitting at a power level that causes too much interference to adjacent sectors. Thus, performance and coverage relating to control messages might be less than ideal.

In conventional systems, an other-sector control message can be utilized to transmit interference information (e.g., amount of interference), as well as for other purposes, including handoff, inter-sector power control for managing inter-sector interference, sector loading, or other control messages. A traditional approach is to transmit the control message from each sector and target a very low spectral efficiency such that the message is decodable at very low signal to noise ratio (SNR) in the adjacent sector. Spectral efficiency is the amount of information that can be transmitted over a given bandwidth and is a measure of how efficiently a limited frequency spectrum is utilized. This results in utilizing a lot of system resources for these other sector control messages that still do not reach all the way into the adjacent sectors. Thus, there is a need in the art for an other sector control transmission technique that utilizes less resources and can target users deep into adjacent sectors.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with transmitting inter-sector control messages utilizing statistical multiplexing in the form of block frequency hopping with pilots. One or more of the disclosed aspects can statistically mitigate a dominant interferer though utilization of an inter-sector control channel.

An aspect relates to a method for transmitting one or more inter-sector control messages. The method includes dividing a set of control channel resources into two or more portions and placing each of the two or more portions on a reduced reuse pattern or a no reuse pattern. The method also includes transmitting a control message during one of the planned reuse patterns.

Another aspect relates to a wireless communications apparatus that includes a memory and a processor. The memory retains instructions related to dividing a set of control channel resources into two or more portions, placing each of the portions on a reduced reuse pattern or a no reuse pattern, and sending a control message during one of the reuse patterns. The processor is coupled to the memory and is configured to execute the instructions retained in the memory.

A further aspect relates to a wireless communications apparatus that transmits one or more inter-sector control messages. Wireless communications apparatus includes a means for splitting control channel resources into two or more segments and a means for locating each of the two or more segments on a reduced reuse pattern or a no reuse pattern. Also included in wireless communications apparatus is a means for conveying the control message to mobile devices in neighboring sectors. The control message is conveyed utilizing the reduced reuse pattern or the no reuse pattern.

Yet another aspect relates to a computer program product comprising a computer-readable medium. The computer-readable medium comprises a first set of codes for causing a computer to divide control channel resources into two or more segments and a second set of codes for causing the computer to locate each of the two or more segments on a reduced reuse pattern or a no reuse pattern. The computer-readable medium further includes a third set of codes for causing the computer to convey the control message to mobile devices in neighboring sectors. The control message is conveyed utilizing the reduced reuse pattern or the no reuse pattern.

Another aspect relates to at least one processor configured to transmit inter-sector control bits. The processor includes a first module for allocating a set of control channel resources and a second module for dividing the set of control channel resources into two or more segments. Further, the processor includes a third module for placing each of the two or more segments on a reduced reuse pattern or a no reuse pattern and a fourth module for conveying a control message that includes the two more segments to one or more mobile devices in neighboring sectors. Each of the two or more segments are placed on the reduced reuse pattern or a no reuse pattern so that neighboring sectors utilize non-overlapping control resources.

Another aspect relates to a method for transmitting an inter-sector broadcast control channel utilizing random statistical averaging. The method includes dividing a set of control channel resources into subsets and selecting at least one of the subsets randomly or pseudo-randomly. The method also includes transmitting a control channel that includes the selected subset to devices in adjacent sectors.

A further aspect relates to a wireless communications apparatus that includes a memory and a processor. The memory retains instructions related to dividing a set of control channel resources into two or more subsets, selecting at least one of the subsets in a random or pseudo-random manner, and conveying a broadcast control channel that includes the selected subset to devices in adjacent sectors. The processor is coupled to the memory and is configured to execute the instructions retained in the memory.

Still another aspect relates to a wireless communications apparatus that transmits an inter-sector control channel utilizing random statistical averaging. The wireless communications apparatus includes a means for partitioning a set of control channel resources into two or more subsets and a means for choosing at least one of the subsets in a random manner or a pseudo-random manner. Also included in wireless communications apparatus is a means for conveying the chosen subset to devices in adjacent sectors. The chosen subset is included in a control channel.

Yet another aspect relates to a computer program product comprising a computer-readable medium that includes a first set of codes for causing a computer to partition a set of control channel resources into two or more subsets. The computer-readable medium also includes a second set of codes for causing the computer to choose at least one of the subsets in a random or a pseudo-random manner and a third set of codes for causing the computer to convey the chosen subset to devices in adjacent sectors. The chosen subset is included in a control channel.

A further aspect relates to at least one processor configured to transmit an inter-sector broadcast control channel utilizing random statistical averaging. The processor includes a first module for allocating a set of control channel resources and a second module for dividing the set of control channel resources into two or more subsets. The processor also includes a third module for selecting at least one of the subsets as a function of a pseudo-random sequence and a fourth module for transmitting the selected subset in a control channel to devices in adjacent sectors. The pseudo-random sequence is based on signaling between base stations. The signaling is over the air or over a backhaul channel.

Still another aspect relates to a method for receiving an inter-sector control channel transmitted with statistical reuse. The method comprises receiving a control channel from a base station in an adjacent sector and detecting a subset of resources in the received control channel. The method also includes identifying a broadcast control message included in one resource of the subset of resources.

Yet another aspect relates to a wireless communications apparatus that includes a memory and a processor. The processor is coupled to the memory and configured to execute the instructions retained in the memory. The memory retains instructions related to receiving a control channel from a base station in an adjacent sector, detecting a subset of resources in the received control channel, and identifying a broadcast control message included in one resource of the subset of resources.

A further aspect relates to a wireless communications apparatus that receives an inter-sector control channel transmitted with statistical reuse. The wireless communications apparatus includes a means for receiving a control channel sent by a base station in an adjacent sector and a means for identifying a subset of resources in the received control channel. Also included in wireless communications apparatus is a means for distinguishing a control message included in a resource of the subset of resources.

Yet another aspect relates to a computer program product comprising a computer-readable medium that includes a first set of codes for causing a computer to receive a control channel sent by a base station in an adjacent sector. The computer-readable medium also includes a second set of codes for causing the computer to identify a subset of resources in the received control channel and a third set of codes for causing the computer to distinguish a control message included in a resource of the subset of resources.

Still another aspect relates to at least one processor configured to receive an inter-sector control channel transmitted with statistical reuse. The processor includes a first module for receiving a control channel from a base station in an adjacent sector and a second module for detecting a subset of resources in the received control channel based on knowledge of a pseudo-random sequence. The processor also includes a third module for identifying a broadcast control message included in one resource of the subset of resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
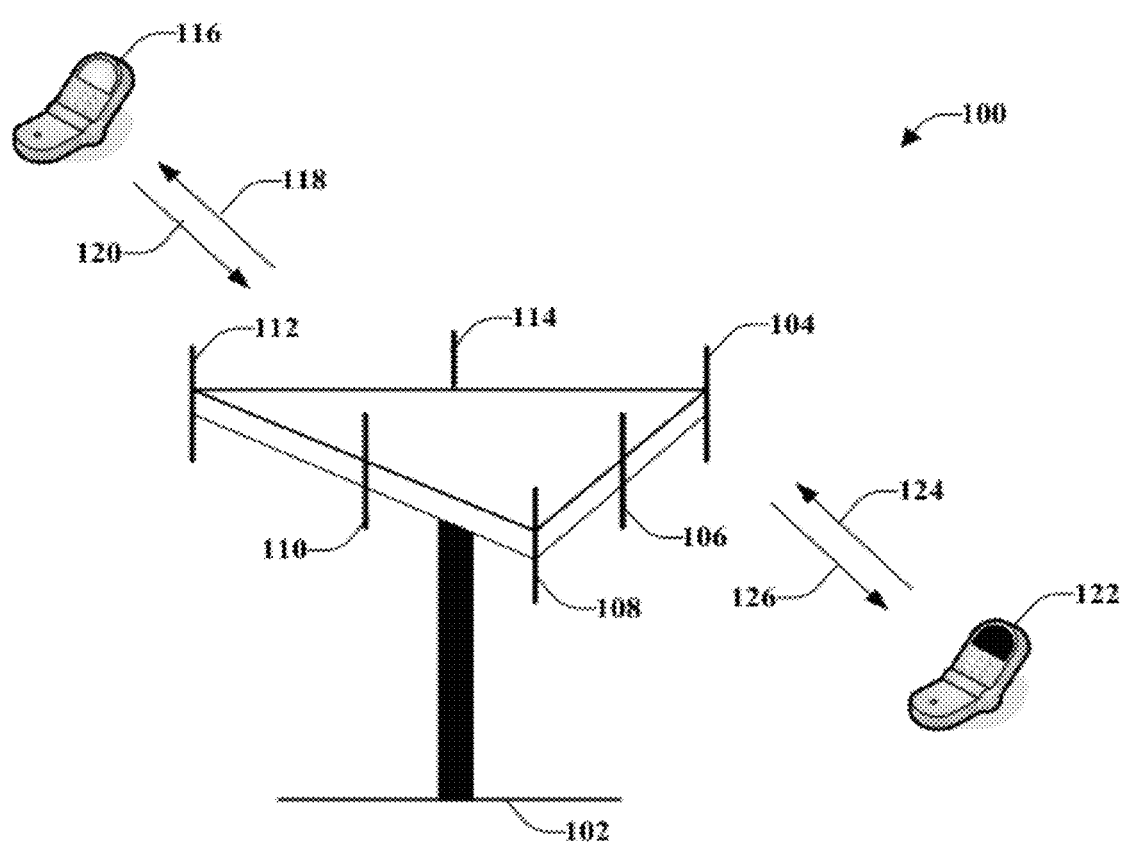
FIG. 1 illustrates a multiple access wireless communication system according to one or more aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, Node B, or some other network entity.

Various aspects or features will be presented in terms of systems that may include a number of devices, components, modules, and the like. It is to be understood and appreciated that the various systems may include additional devices, components, modules, and the like, and/or may not include all of the devices, components, modules, and the like, discussed in connection with the figures. A combination of these approaches may also be used.

Referring now to FIG. 1, a multiple access wireless communication system 100 according to one or more aspects is illustrated. A wireless communication system 100 can include one or more base stations in contact with one or more user devices. Each base station provides coverage for a plurality of sectors. Illustrated is a three-sector base station 102 that includes multiple antenna groups, one including antennas 104 and 106, another including antennas 108 and 110, and a third including antennas 112 and 114. According to the figure, only two antennas are shown for each antenna group, however, more or fewer antennas may be utilized for each antenna group. Mobile device 116 is in communication with antennas 112 and 114, where antennas 112 and 114 transmit information to mobile device 116 over forward link 120 and receive information from mobile device 116 over reverse link 118. Forward link (or downlink) refers to the communication link from the base stations to mobile devices, and the reverse link (or uplink) refers to the communication link from mobile devices to the base stations. Mobile device 122 is in communication with antennas 104 and 106, where antennas 104 and 106 transmit information to mobile device 122 over forward link 126 and receive information from mobile device 122 over reverse link 124.

Each group of antennas and/or the area in which they are designated to communicate may be referred to as a sector of base station 102. In one or more aspects, antenna groups each are designed to communicate to mobile devices in a sector or the areas covered by base station 102. A base station may be a fixed station used for communicating with the terminals.

In accordance with the various aspects presented herein, mobile devices that are in adjacent cells (not shown) and served by other base stations (not shown) can create interference to base station 102 and/or mobile devices it is serving (e.g., mobile devices 116, 122). This interference can occur on a reverse link when the mobile device in the adjacent cell is transmitting to its serving base station. In order to mitigate the interference, base station 102 can transmit an inter-sector control message utilizing planned frequency reuse, statistical reuse, a reduced reuse pattern and/or a no reuse pattern in accordance with the aspects disclosed herein and discussed in further detail below. As used herein, the term "cell" refers to a base station and its coverage area, depending on the context in which the term is used. It should be understood that although various examples are provided that relate to interference, the disclosed aspects are not so limited and the inter-sector control channel can be utilized to convey other types of information (e.g., access control, power control, system control, signaling, and so forth). In accordance with some aspects, a frequency of one can be utilized, however, the disclosed aspects can be applied when the data channels have other reuse factors on them and the disclosed aspects can further increase the reuse factor.

Figure 2:
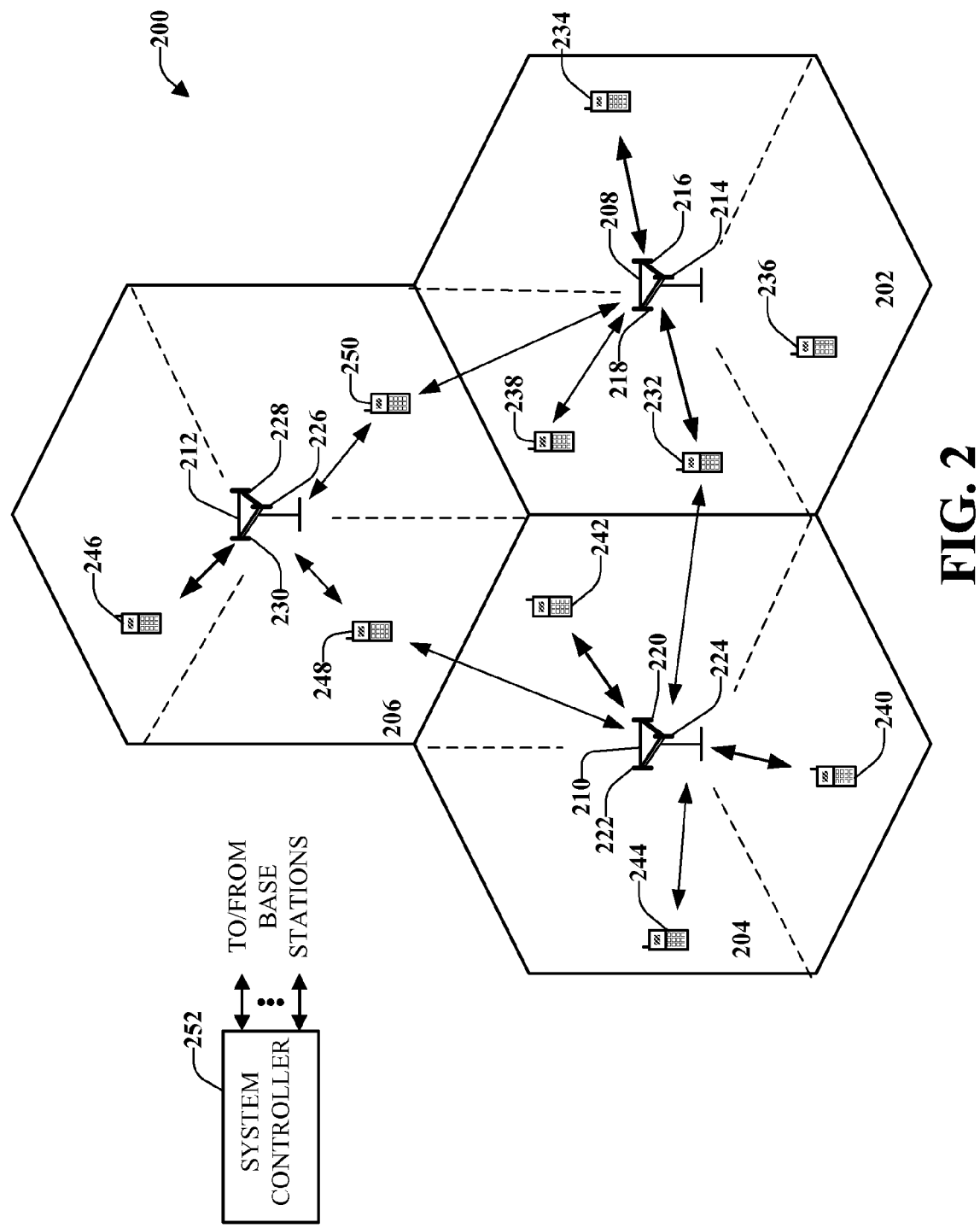
FIG. 2 illustrates another representation of a multiple access wireless communication system for communication of inter-sector control bits in accordance with the aspects presented herein.

FIG. 2 illustrates a multiple access wireless communication system 200 for communication of inter-sector control bits in accordance with the aspects presented herein. System 200 can facilitate transmission of a control message that can be received by mobile devices in an adjacent sector, while providing improved performance and range over traditional systems. System 200 can further mitigate a dominant source of interference for severely interference limited users for inter-sector control channels without network planning.

For a sectorized cell, the access points for all sectors of that cell are typically co-located within the base station for the cell. The inter-sector channel bit transmission techniques described herein may be used for a system with sectorized cells and a system with un-sectorized cells. In this description, the term "sector" refers to a conventional base station and/or its coverage area for a system with sectorized cells and/or a conventional base station and/or its coverage area for a system with un-sectorized cells. The terms "mobile device" (or the like) and "user" may be used interchangeably, and the terms "sector" and "base station" may also be used interchangeably. A serving base station/sector is a base station/sector with which a terminal communicates. A neighbor (or adjacent) base station/sector is a base station/sector with which the terminal is not in communication.

The inter-sector channel bit transmission techniques may also be used for various multiple-access communication systems. For example, these techniques may be used for a code division multiple access (CDMA) system, a frequency division multiple access (FDMA) system, a time division multiple access (TDMA) system, an orthogonal frequency division multiple access (OFDMA) system, an interleaved (IFDMA) system, a localized FDMA (LFDMA) system, a spatial division multiple access (SDMA) system, a quasi-orthogonal multiple-access system, and so on. IFDMA is also called distributed FDMA, and LFDMA is also called narrowband FDMA or classical FDMA.

In further detail, multiple access wireless communication system 200 includes multiple cells, illustrated as cells 202, 204, and 206. In FIG. 2, each cell 202, 204, and 206 can include a base station 208, 210, 212 that includes multiple sectors. The multiple sectors are formed by groups of antennas each responsible for communication with access terminals in a portion of the cell. In cell 202, antenna groups 214, 216, and 218 each correspond to a different sector. In cell 204, antenna groups 220, 222, and 224 each correspond to a different sector. In cell 206, antenna groups 226, 228 and 230 each correspond to a different sector.

Each cell includes several mobile devices, illustrated as access terminals, which are in communication with one or more sectors of each base station. Mobile devices are typically dispersed throughout the system, and each terminal can be fixed or mobile. A terminal can communicate with zero, one, or multiple base stations on the forward and reverse links at any given moment. For example, access terminals 232, 234, 236, and 238 are in communication with base station 208, access terminals 240, 242, and 244 are in communication with access point 210, and access terminals 246, 248, and 250 are in communication with access point 212.

As illustrated in cell 204, for example, each access terminal 240, 242, and 244 is located in a different portion of it respective cell than each other access terminal in the same cell. Further, each access terminal 240, 242, and 244 can be a different distance from the corresponding antenna groups with which it is communicating. Both of these factors provide situations, also due to environmental and other conditions in the cell, to cause different channel conditions to be present between each access terminal and its corresponding antenna group with which it is communicating.

A controller 252 is coupled to each of the cells 202, 204, and 206 and provides coordination and control for the respective base stations. Controller 252 can be a single network entity or a collection of network entities. For a distributed architecture, the base stations can communicate with one another as needed. Controller 252 can contain one or more connections to multiple networks, such as the Internet, other packet based networks, or circuit switched voice networks that provide information to, and from, the access terminals in communication with the cells of the multiple access wireless communication system 200. Controller 252 includes, or is coupled with a scheduler that schedules transmission from and to access terminals. In some embodiments, scheduler can reside in each individual cell, each sector of a cell, or a combination thereof.

It should be noted that while FIG. 2, depicts physical sectors (e.g., having different antenna groups for different sectors), other approaches can be utilized. For example, utilizing multiple fixed "beams" that each cover different areas of the cell in frequency space can be utilized in place of, or in combination with, physical sectors.

In accordance with some aspects, access terminals in a particular cell may be in communication with the base station associated with that cell and at substantially the same time can cause interference to a base station (and/or mobile device) associated with a neighboring cell. For example, when access terminal 232 communicates with its serving base station 208 on the reverse link, the communication may also be received by access point 210. This can cause inter-sector interference (also referred to as other sector interference (OSI)) to access point 210 and/or the mobile devices it is serving. In a similar manner, communications from access terminal 248 may be received (e.g., interference) by access points 210 and 212, communications from access terminal 250 may be received (e.g., interference) by access points 208 and 212, and so forth. In an attempt to mitigate the interference experienced, base station 210, for example, can send one or more inter-sector control bits that contain control information to the mobile devices that are causing interference, as well as other mobile devices that can receive the signal transmitted by base station 210. Further, inter-sector control channels can be utilized to provide handoff information as well as other information that might be useful to mobile devices in adjacent cells. Further information relating to conveying inter-sector control channels in accordance with various aspects is described in further detail below.

Figure 3:
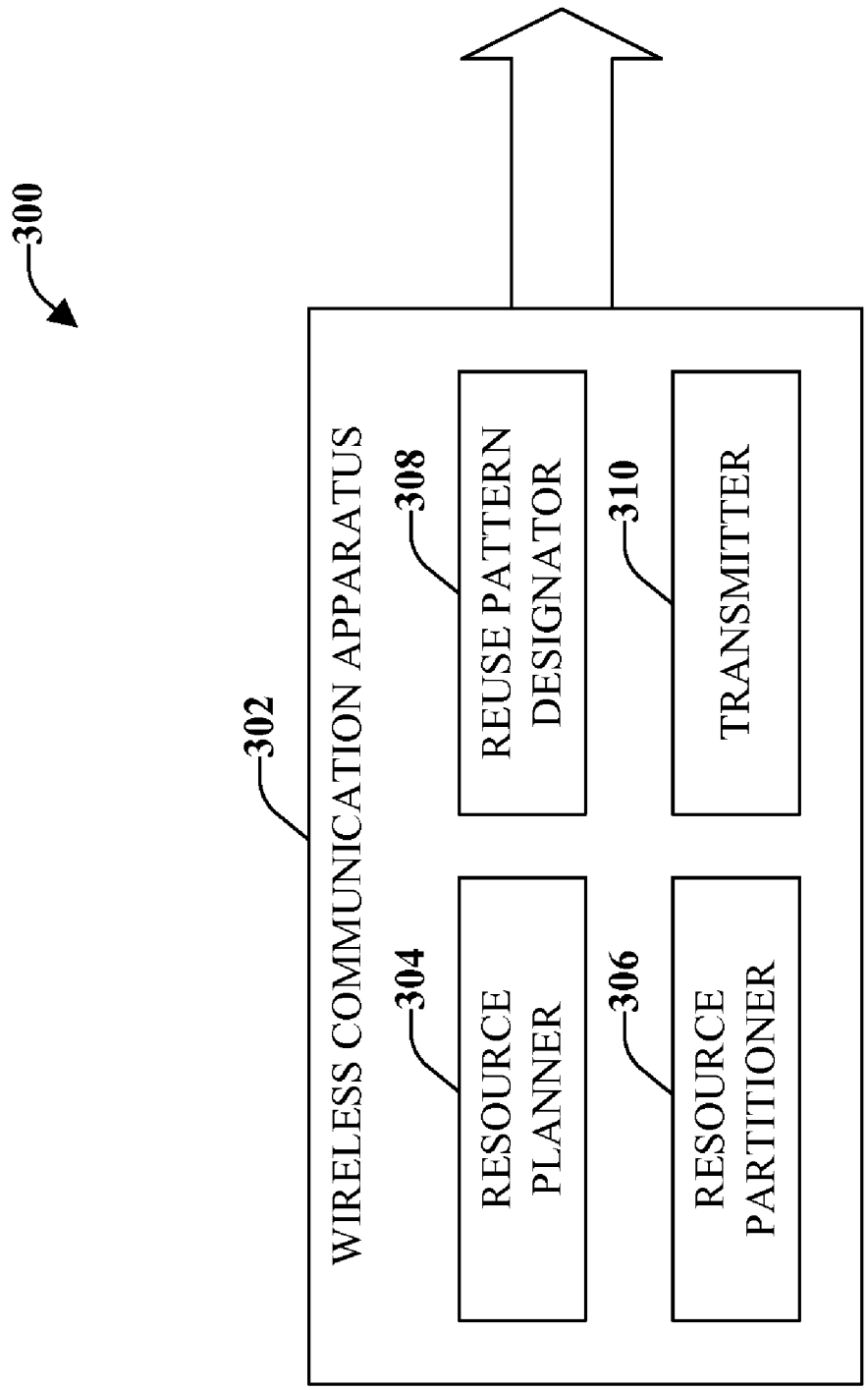
FIG. 3 illustrates a system that transmits inter-sector control bits utilizing planned frequency reuse in accordance with an aspect.

FIG. 3 illustrates a system 300 that transmits inter-sector control bits utilizing planned frequency reuse in accordance with an aspect. The transmission can include a control channel that can be received by devices in a neighboring sector for a multitude of purposes. For example, the control channel can include information related to handoff, system parameters, sector loading, indicating an amount of interference, inter-sector power control for managing inter-sector interference, for broadcast transmission, of for other information.

Some conventional systems transmit a message from each sector and target a very low spectral efficiency such that the message is decodable at very low SNR in the adjacent sector. Such systems utilize a frequency reuse that is common for data across the entire frequency bandwidth. System 300 can utilize system planning to allow for the reuse of time-frequency resources.

System 300 includes a wireless communication apparatus 302 that is shown to be transmitting data through a channel. Although depicted as transmitting data, wireless communication apparatus 302 can also receive data through the channel (e.g., wireless communication apparatus 302 can, at substantially the same time, transmit and receive data, wireless communication apparatus 302 can transmit and receive data at different times, or combinations thereof). Wireless communication apparatus 302, for example, can be a base station (e.g., base station 102 of FIG. 1, . . . ).

Included in wireless communication apparatus 302 is a resource planner 304 that identifies a set of resources for transmitting a message. The identified set of resources can be set aside or allocated for the message transmission. The set of resources can include time, frequency, code space, power, or other system resources. After the set of resources have been allocated for the message, a resource partitioner 306 divides the identified set of resources. For example, the identified set of resources can be divided into n number of partitions, where n is integer, each partition including one or more resources.

A reuse pattern designator 308 assigns the divided identified set of resources to a reuse pattern and a transmitter 310 sends the control message over the channels to devices in the neighboring sector. The control message can be sent utilizing a reduced reuse pattern or no reuse pattern. The transmission comprises a mixture of pilot symbols and data symbols and is intended for a mobile device in a neighboring sector.

In accordance with some aspects, the control channel resources can be placed on the reduced reuse pattern so that adjacent sectors (e.g., adjacent base stations) utilize non-overlapping control channel resources (e.g., adjacent cells are utilizing a different frequency). Since neighboring sectors are utilizing different frequencies, interfering sectors (e.g., sectors using the same frequency) are farther away and, thus, interference is mitigated. This placement can improve the SNR on resources for mobile devices in the adjacent sectors where the control message is targeting since it can mitigate a dominant source of interference for the inter-sector control channel (e.g., the serving sector of the targeted mobile device).

In accordance with some aspects, the reduced reuse pattern and/or no reuse pattern is predefined. For example, a frequency reuse can be one, however, for the symbol time associated with the control channel, the frequency reuse, as determined by reuse pattern designator 308 (e.g., a different reuse pattern for adjacent cells), is utilized.

By way of example and not limitation, in an UMB system, an OSI channel is a channel that occurs simultaneously in all sectors. Thus, planned frequency reuse (e.g., reduced reuse, no reuse) in accordance with the disclosed aspects can be performed for that symbol time. The remainder of data can be at a frequency reuse of "1", but during the OSI channel symbol time there can be a planned frequency reuse where neighboring sectors or some number of tiers away from the transmitting base station (one or more tier) are utilizing different frequencies. In this case, when a base station in sector A is attempting to transmit control information to sector B, the base station in Sector B is not using the same frequency as that utilized by Sector A to transmit the information during this symbol time. The sectors are not utilizing the same frequency because planned frequency reuse is utilized, and generally, neighboring sectors do not use the same frequency since the reuse is planned. Thus, the frequencies of the surrounding base stations (e.g., base station in Sector A) can be received. Thus, a more robust channel that can use less resources and penetrate much deeper into the other sectors can be realized though the planned reuse techniques disclosed herein.

Figure 4:
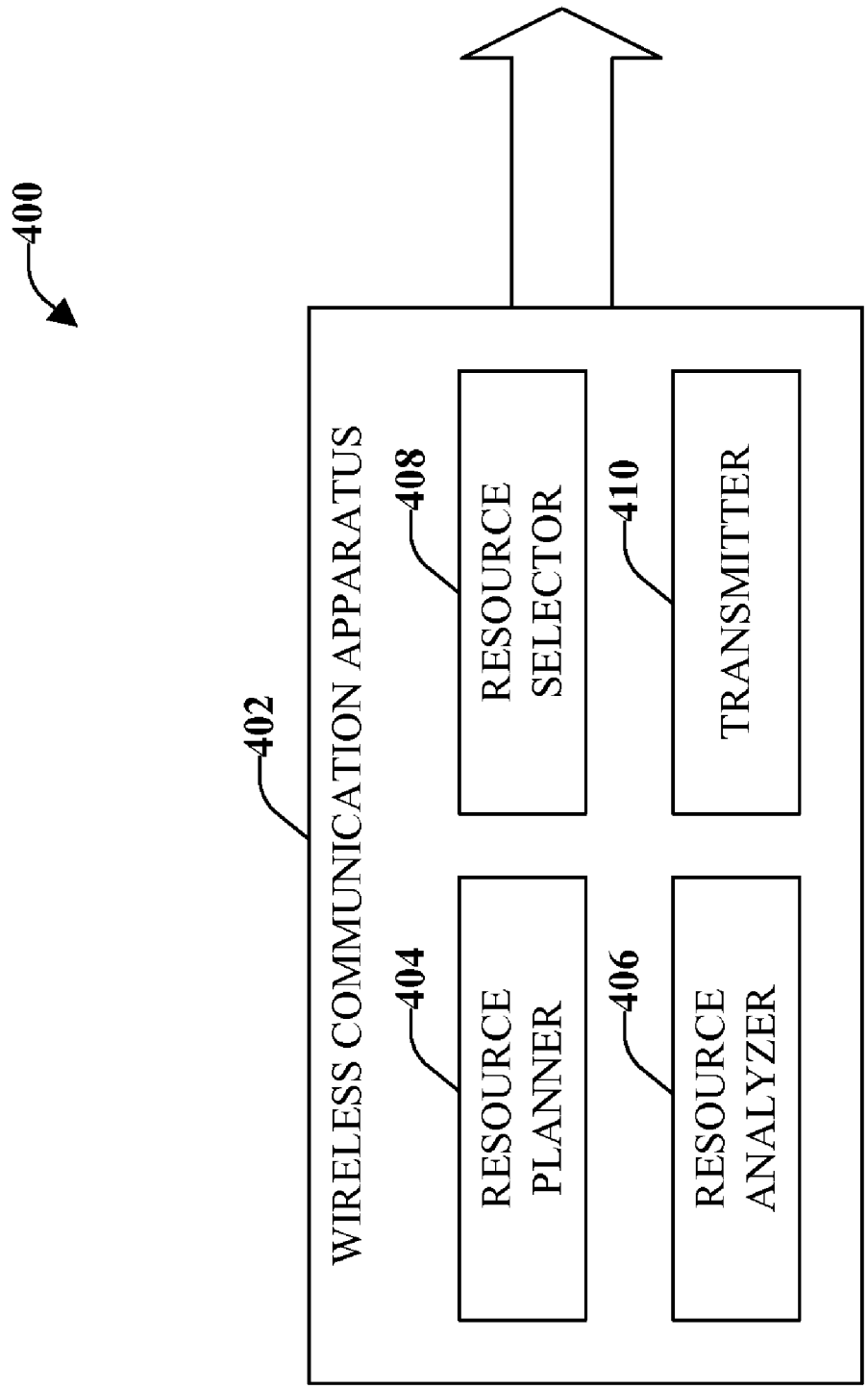
FIG. 4 illustrates a system that transmits inter-sector control bits utilizing statistical frequency reuse in accordance with an aspect.

FIG. 4 illustrates a system 400 that transmits inter-sector control bits utilizing statistical frequency reuse in accordance with an aspect. System 400 can provide further performance improvement and coverage gain by mitigating a dominant source of interference for severely limited users in inter-sector control channels. Further, system 400 can mitigate resource planning by utilizing resource hopping. Resource planning is needed in planned reuse schemes in order to mitigate the occurrence of neighboring sectors utilizing the same frequency.

System 400 includes a wireless communication apparatus 402 that is shown to be transmitting data through a channel. Although depicted as transmitting data, wireless communication apparatus 402 can also receive data through the channel (e.g., wireless communication apparatus 402 can, at substantially the same time, transmit and receive data, wireless communication apparatus 402 can transmit and receive data at different times, or combinations thereof). Wireless communication apparatus 402, for example, can be a base station (e.g., base station 102 of FIG. 1, . . . ).

Wireless communication apparatus 402 includes a resource planner 404 that allocates a set of resources for transmission of a control message. The set of resources can include time, frequency, code space, power or other system resources. A channel resource analyzer 406 divides the channel resources into subsets. These subsets can be divided in p number of subsets, each subset including one or more resources, where p is an integer. In accordance with some aspects, the subsets can be smaller portions of the bandwidth than the partitions created by resource partitioner 306 of FIG. 3.

A channel resource selector 408 is configured to select at least one subset of resources for transmission over the channel by transmitter 410. The transmission can include a mixture of pilot symbols and data symbols. The hopping provides a statistical unplanned reuse. The transmission is encoded with a redundancy over two or more selected subsets so that any one of the subset of resources sets contains the control message.

In accordance with some aspects, at least one of the subset of resources is selected in a pseudo-random manner. The pseudo-random sequence can be based on signaling between base stations, wherein the signaling is over the air or over a backhaul channel. For example, after a random selection of the subset of resources, the pattern is fixed for a number of transmissions and then another random selection is performed and fixed for a number of transmissions, and so forth. The number of transmissions can be the same for each pattern, can change for each pattern, or combinations thereof.

In another example, a similar pattern number (PN) generation algorithm can be utilized by both the access point and the mobile device. The sequence can be based on an Access Point frame number, time, and/or other parameters (e.g., parameters included in an access point broadcast overhead message). In such a manner, the mobile device can independently determine (e.g., compute) which subsets will be utilized by the access point.

In accordance with other aspects, the random (or pseudorandom) selection can change between predefined patterns or it can be a random selection from a linear feedback register, for example. According to some aspects, the subset of resources is selected randomly and remains fixed to that pattern (e.g., similar to planned reuse).

According to other aspects, a new (random or pseudorandom) pattern can be selected for each transmission. Random, or pseudo-random selection, in accordance with this aspect can provide that if there is a collision on a transmission, on the next transmission (utilizing a different, (pseudo-) random selection), the chance of the same resources colliding is mitigated. However, if the pattern is selected and then fixed, there is the possibility that one or more resources will collide and, since the pattern is fixed, those same resources will collide until a different pattern is utilized.

In accordance with some aspects, the selection utilizes a deterministic series of patterns to create the hopping pattern. For example, for each transmission, a next pattern from a series of patterns is selected. After utilizing the last pattern in a series of patterns, the first pattern is utilized again, followed by the second pattern, and so forth. Thus, for each transmission the selection moves to the next pattern, whether random or fixed, the pattern can move every x times, where x is an integer, the pattern can move at a random offset, or combinations thereof. According to some aspects, the series of patterns is based on the access point (AP) timing, a frame count, or combinations thereof.

In accordance with some aspects, wireless communication apparatus can communicate with neighboring sectors on another channel, such as a backhaul channel. The backhaul refers to base stations communicating directly. If a collision is detected by a sector, that sector can communicate the collision with other sectors. The channel resource selector 408 can intelligently select another pattern or re-randomize based on the collisions information.

For example purposes and not limitation, an OFDMA system will now be discussed, although the disclosed aspects can be utilized with other systems. An OSI might last for one symbol time and there are 512 subcarriers. Instead on transmitting the control channel on all 512 subcarriers, for planned reuse the 512 subcarriers are divided into a groups of subcarriers, such as eight groups, for example. In the planned reuse scenarios, the first subset of subcarriers are assigned to a first sector, a second subset of subcarriers are assigned to a second sector, a third subset of subcarriers are assigned to a third sector, and so forth.

Continuing the above example, for random statistical averaging, for each OSI a set of subcarriers are randomly selected, which can be selected in a pseudo-random manner. A set of subcarriers is selected and redundant information is transmitted. If a mobile device is able to decode any of the subcarriers, then the mobile device is able to detect the OSICH message. For example, sector 1 chooses subcarriers 1, 22, and 38 and sector 2 chooses subcarriers 1, 22 and 50. If the mobile device is in sector 2 and subcarriers 1 and 22 collide, mobile device will not receive those subcarriers. However, mobile device will receive subcarrier 38 successfully because there is no collision. If the selection is random for each transmission, even if all three subcarriers collide, on the next transmission there is a low probability that there will be another collision on all subcarriers.

By way of example and not limitation, the following is a realization of the random statistical averaging for an OFDMA broadcast control symbol with 512 subcarriers. In this example, each sector selects 32 subcarriers, which randomly hop in groups of 8 subcarriers. Each group of 8 subcarriers includes a mixture of pilot symbols and data symbols. The pilots can be utilized for interference estimation. The control channel is encoded with a redundancy so that any one of the four 8 subcarrier sets contains the broadcast control message. The receiver (e.g., access terminal) utilizes the pilots to estimate an interference on each of the sets of 8 subcarriers. The receiver selects the sets with sufficiently high SNR. For a receiver deep inside the adjacent sector (e.g., a non-edge user), the probability of all four 8 subcarrier sets overlapping with the four from the access terminal's serving sector is small.

Figure 5:
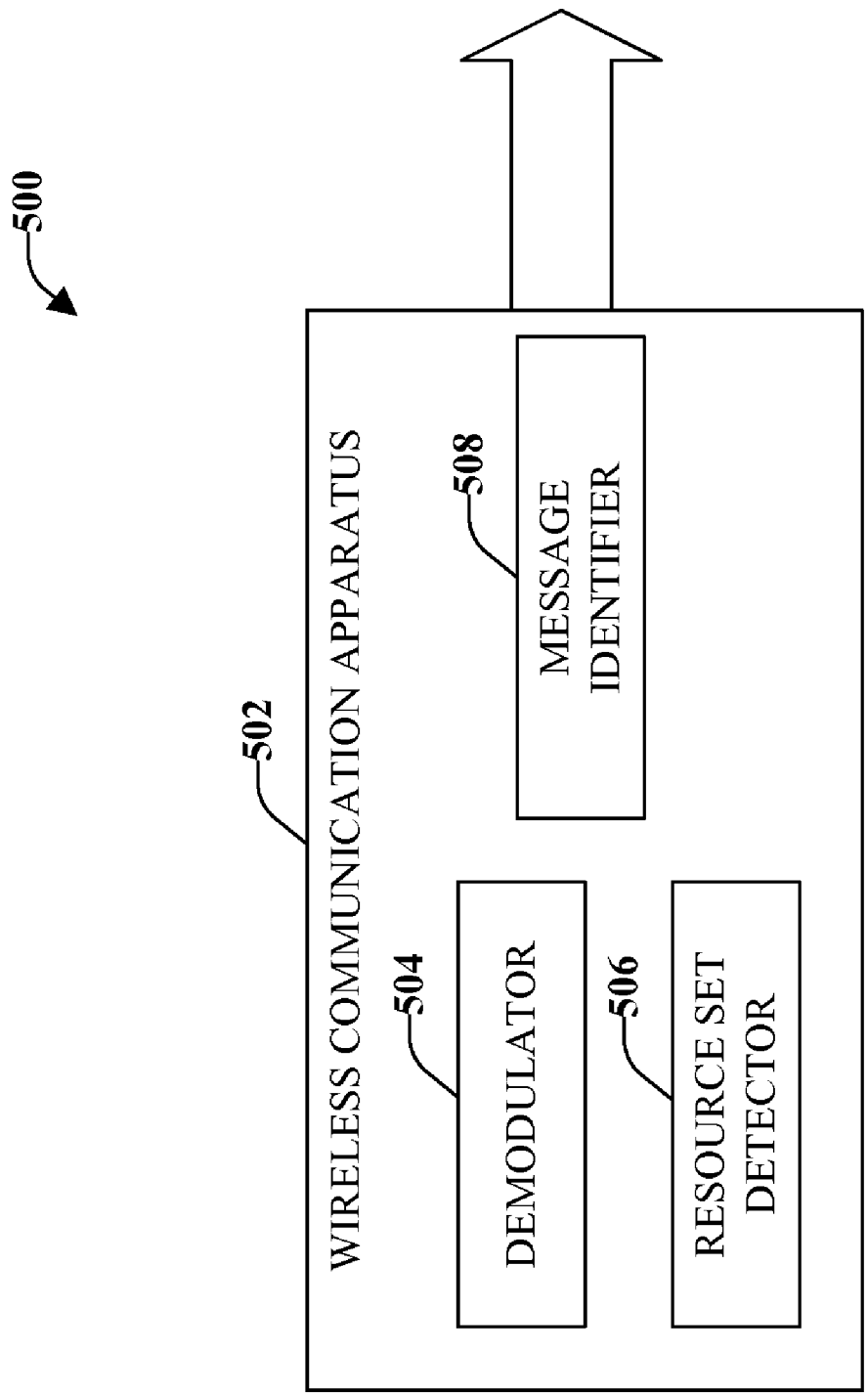
FIG. 5 illustrates a system that receives inter-sector control bits that were sent utilizing random statistical averaging in accordance with an aspect.

FIG. 5 illustrates a system 500 that utilizes pilots in the statistical reuse for interference estimation. Statistical reuse can provide a performance and coverage gain over traditional system by mitigating a dominant source of interference for severely interference limited users for inter-sector control channels. Statistical reuse can also mitigate the need for network planning, which can be useful for ad hoc networks.

System 500 includes a wireless communication apparatus 502 that is shown to be transmitting data through a channel. Although depicted as transmitting data, wireless communication apparatus 502 can also receive data through the channel (e.g., wireless communication apparatus 502 can, at substantially the same time, transmit and receive data, wireless communication apparatus 502 can transmit and receive data at different times, or combinations thereof). Wireless communication apparatus 502, for example, can be a mobile device (e.g., mobile device 116, 122 of FIG. 1, . . . ). In accordance with some aspects, wireless communication apparatus 502 is a base station that communicates over a backhaul.

Wireless communications apparatus 502 receives a signal that includes control bits that were sent utilizing a random statistical averaging. A demodulator 504 is configured to demodulate the subset of channels that were received. The subset of resources are a portion of a set of resources allocated for transmission of the control message. The subset of resources contain time, frequency, code space and/or power resources. This subset of channels is the subset that was selected by a base station (e.g., wireless communications apparatus 502 of FIG. 4) in a random or pseudo random manner (e.g., based on statistical reuse). In accordance with this aspect, demodulator 504 does not have to demodulate the entire OSICH, only the subset. For example, the demodulation can be over a set of eight subcarriers, wherein the first subcarrier is pilot signals.

The signal transmitted can include a mixture of pilot symbols and data symbols. A resource set detector 506 is configured to identify a subsets of subcarriers (e.g., resources) within the received signal that randomly hop together. The subset of resources can be detected based on knowledge of a pseudo-random sequence. For example if the sector has selected 32 subcarriers for transmission, the 32 subcarriers can hop in groups of 8 subcarriers.

A control message identifier 508 can identify one or more subcarriers within the detected subset of resources that includes a control message. The one or more subcarriers can be a control channel that is encoded with a redundancy such that any one of the four 8 subcarrier sets, as in the above example, contain the control message.

The information included in the control message is selectively utilized by wireless communications apparatus 502. For example, the pilots can be utilized to estimate interference on each of the sets of 8 subcarriers and the set with sufficiently high SNR can be selected. For users deep inside the adjacent sector, the probability of all four 8 subcarrier sets overlapping with the four from the user's serving sector is small.

In another example, wireless communications apparatus 502 can analyze the different subsets received (e.g., from a first sector) and determine an estimated signal strength. For example, a pilot strength estimator (not shown) can determine the SIR on that set of subcarriers and the signal share ratio. For example, if there are three subsets, the best subset can be chosen based on one or a combination of criteria (e.g., strength of the signal, amount of interference detected, and so forth). In accordance with some aspects, the subsets received can be combined intelligently based on a relative strength of the different subcarriers. It should be noted that other channels received (e.g., not broadcast control channels) might utilize a reuse of "1", thus there can be collision on those channels.

Inter-sector interference may be controlled using a control channel transmission as disclosed herein. This control message can inform mobile devices in neighboring sectors of the interference, and each device can adjust its transmit power accordingly so that the inter-sector interference can be maintained within acceptable levels.

In accordance with some aspects, wireless communication apparatus 502 receives two or more subsets of resources and jointly decodes the subset of resources to obtain a control message. The joint decoding can be based on pilot symbols contained in the subsets.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
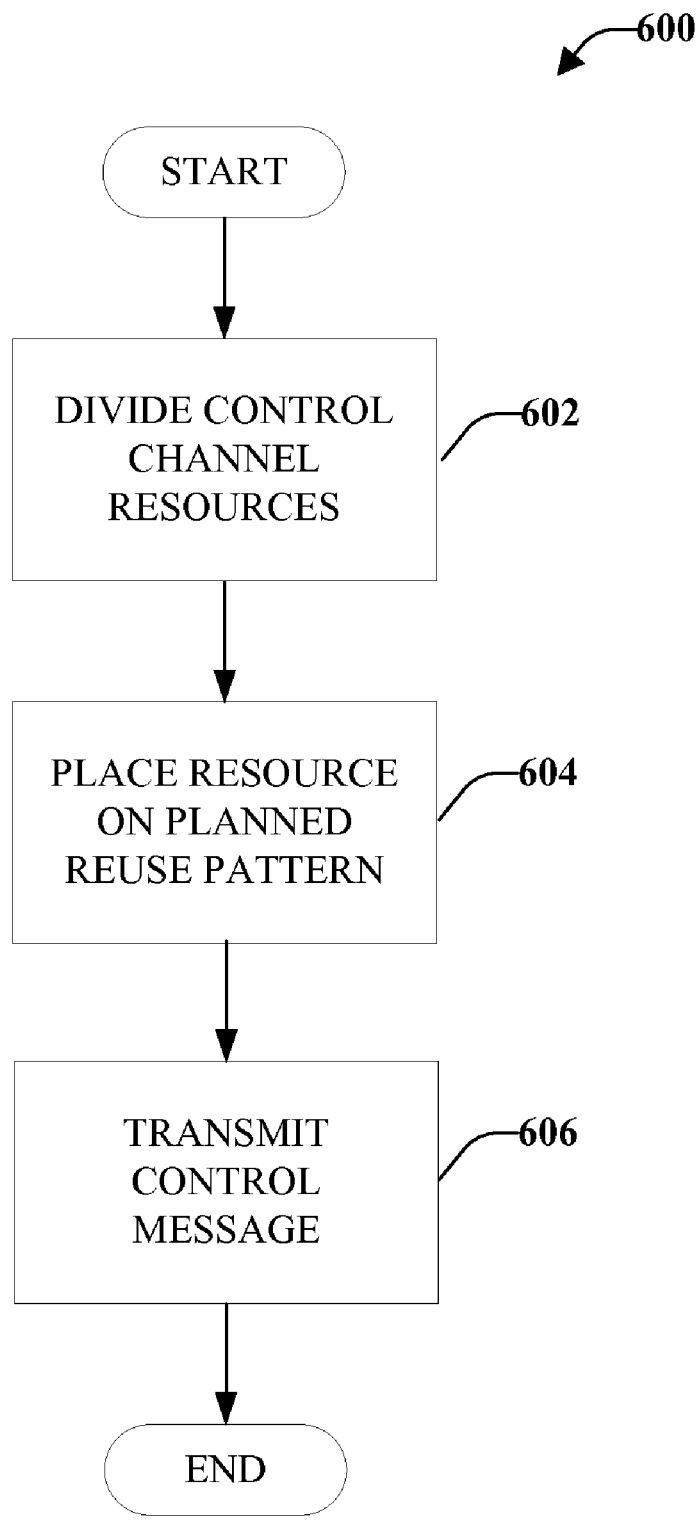
FIG. 6 illustrates a method for transmitting inter-sector control messages utilizing planned frequency reuse in accordance with various aspects.

FIG. 6 illustrates a method 600 for transmitting inter-sector control messages utilizing planned frequency reuse in accordance with various aspects. In accordance with some aspects, the messages can be transmitted as one or more bits. Method 600 starts at 602, when a control channel resource is divided into resource partitions. For example, the control channel resource can be divided into two or more partitions wherein each partition includes a subset of resources. The control channel resources can be a set of resources that are set aside for transmitting a control message. The set of resources can include time, frequency code space, power, or other system resources. In accordance with some aspects, a set of resources for transmission of the control message are allocated prior to dividing the set of control channel resources into two or more portions.

At 604, each of the partitions of resources is placed on a reuse pattern, which can be a reduced reuse pattern or a no reuse pattern. In accordance with some aspects, the subsets of resources are placed on the reduced reuse pattern such that adjacent sectors utilize non-overlapping control channel resources. Placing the partitions of resources in such a manner can improve the SNR on the resources for users in the adjacent sectors where the control message is targeting since it can mitigate the dominant source of interference for an inter-sector control channel (e.g., the serving sector of the targeted user). It should be noted that method 600 utilizes system planning to allow for the reuse of the time-frequency resources.

The control message is sent, at 606, over the subset of resources and intended for one or more mobile devices in a neighboring sector. The transmission of the control message can include a mixture of pilot symbols and data symbols. These control messages can include information that might be useful for mobile devices in neighboring sectors, such as system information that can be utilized for handoff, interference information that can be utilized by the receiving mobile device to adjust its transmit power level, or for other purposes.

Figure 7:
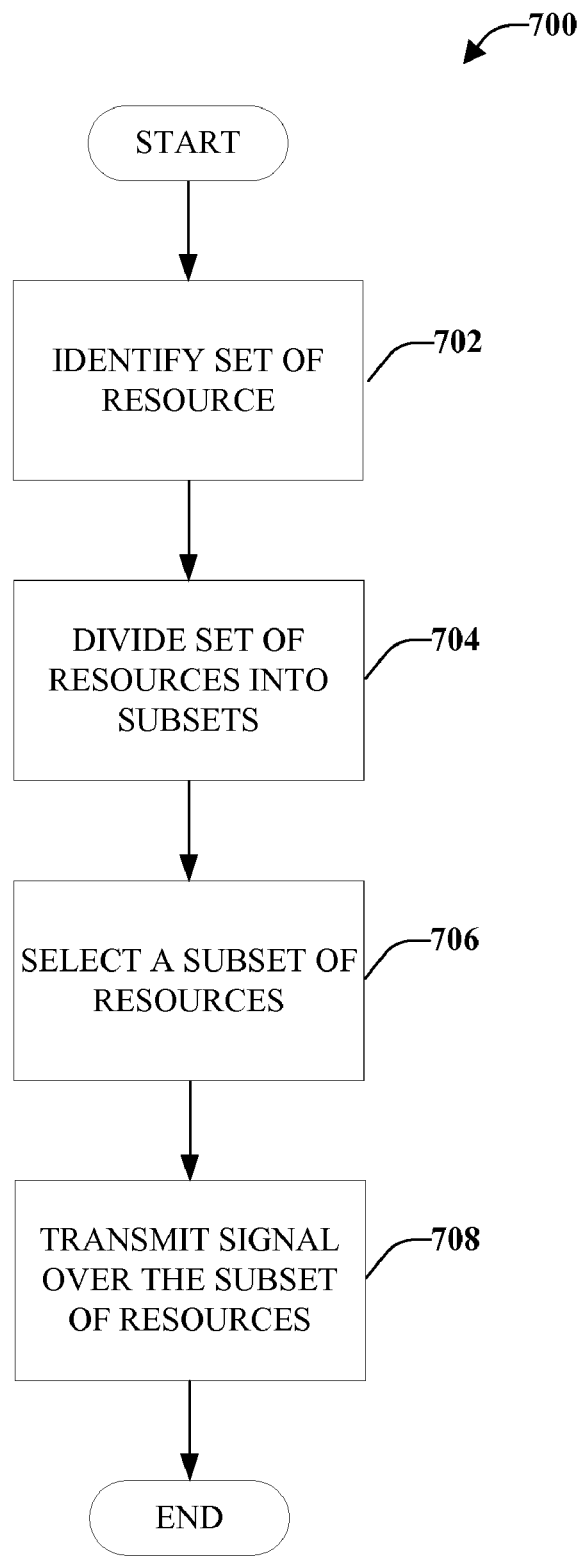
FIG. 7 illustrates a method for transmitting inter-sector control messages utilizing random statistical averaging in accordance with an aspect.

With reference now to FIG. 7, illustrated is a method 700 for transmitting inter-sector control messages utilizing random statistical averaging in accordance with an aspect. Method 700 can use resource hopping to mitigate the reuse requirement. The resource hopping provides a statistical unplanned reuse.

At 702, a set of control channel resources is identified and allocated (or set aside) for transmitting a control message. The set of resources can include time, frequency code space, power, or other system resources. This set of resources is divided into subsets, at 704. In accordance with some aspects, the set of control channel resources for transmission of the control message are allocated before dividing the set of control channel resources into subsets.

At 706, at least one of the subset of resources is selected. A signal that includes the subset of resources is transmitted, at 708, to devices in adjacent sectors. In accordance with some aspects, the smaller subset is selected in a pseudo-random manner or in a completely random manner. The pseudo-random sequence can be based on signaling between base stations, wherein the signaling is over the air or over a backhaul channel.

For example, a subset of resources can be selected randomly such that the likelihood of adjacent transmissions utilizing the same subset of resources is low. In accordance with some aspects, the subset of resources can be selected randomly and the same subset of resources utilized for a limited number of transmissions, after which a different subset is randomly selected. According to other aspects, the subset is selected randomly and then fixed.

In accordance with some aspects, a deterministic series of patterns to create the hopping pattern (e.g., select the subset of resources) is utilized. The series of patterns can be based on the access point (AP) timing, a frame count, or combinations thereof, in accordance with some aspects.

For example, for each transmission, a next pattern from a series of patterns is selected. After utilizing the last pattern in a series of patterns, the first pattern is utilized again, followed by the second pattern, and so forth. Thus, for each transmission the selection moves to the next pattern, whether random or fixed, the pattern can move every x times, where x is an integer, the pattern can move at a random offset, or combinations thereof.

The transmission can include a mixture of pilot symbols and data symbols. According to some aspects, the transmission occurs over a backhaul channel. For example, if a collision is detected by a sector, that sector can communicate the collision with other sectors and a different pattern or subset of resources can be intelligently selected. In accordance with some aspects, the control channel is encoded with a redundancy over two or more selected subsets.

Figure 8:
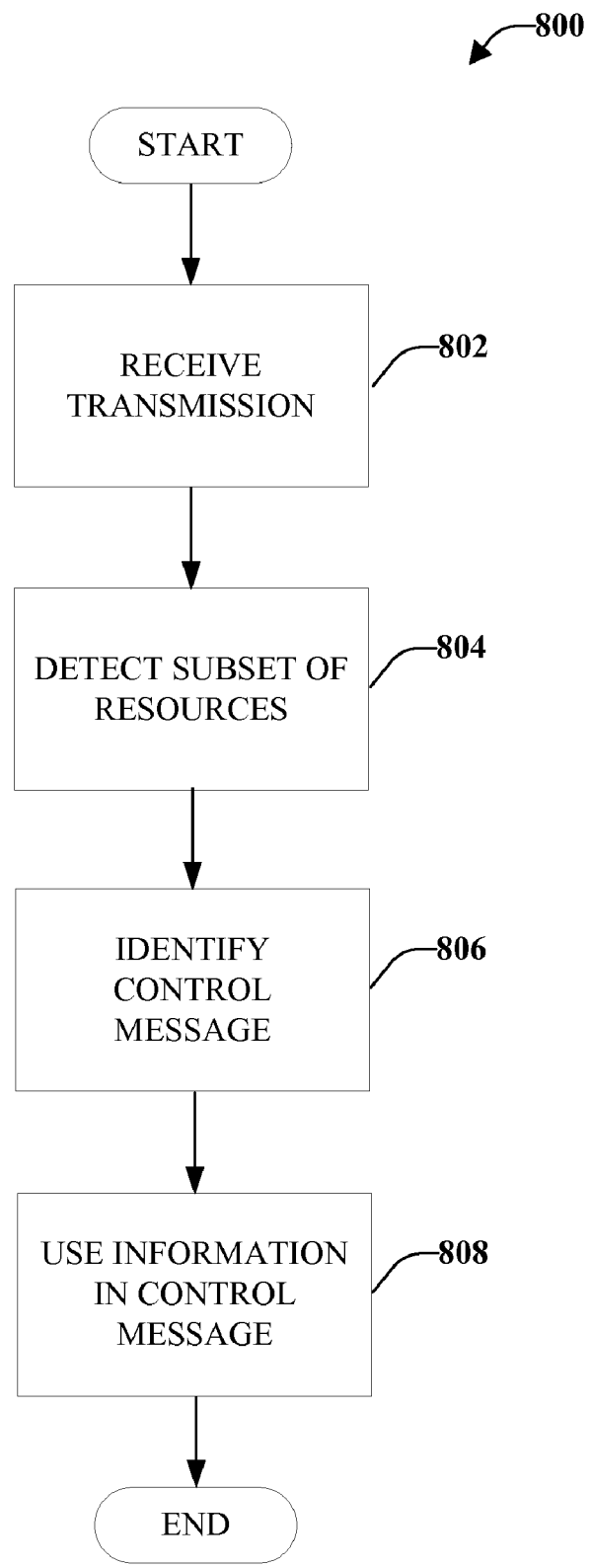
FIG. 8 illustrates a method for receiving an inter-sector control channel transmitted utilizing statistical reuse in accordance with an aspect.

FIG. 8 illustrates a method 800 for receiving an inter-sector control channel transmitted utilizing statistical reuse in accordance with an aspect. At 802, a transmission is received from a neighboring sector. The transmission can include a control channel sent by a base station in an adjacent sector. The transmission can include a mixture of pilot symbols and data symbols.

Subsets of subcarriers (e.g., resources) within the transmission can randomly hop together and are detected, at 804. For example if the sector has selected 32 subcarriers for transmission, the 32 subcarriers can hop in groups of 8 subcarriers. The subset of resources can be detected based on knowledge of a pseudo-random sequence. The subset of resources are a portion of a set of resources allocated for transmission of the control message. In accordance with some aspects, the subset of resources contain time, frequency, code space, or power resources.

At least one subcarrier within the detected subset of resources that includes a control message is identified, at 806. The at least one subcarrier can be a control channel that is encoded with a redundancy such that any one of the four 8 subcarrier sets, as in the above example, contain the control message. The information included in the control message is selectively utilized, at 808. For example, the pilots can be utilized to estimate interference on each of the sets of 8 subcarriers and the set with sufficiently high SNR can be selected. For users deep inside the adjacent sector, the probability of all four 8 subcarrier sets overlapping with the four from the user's serving sector is small.

In accordance with some aspects, method 800 includes receiving two or more subsets of resources and jointly decoding the subset of resources to obtain a control message. The joint decoding can be based on pilot symbols in the subsets.

Figure 9:
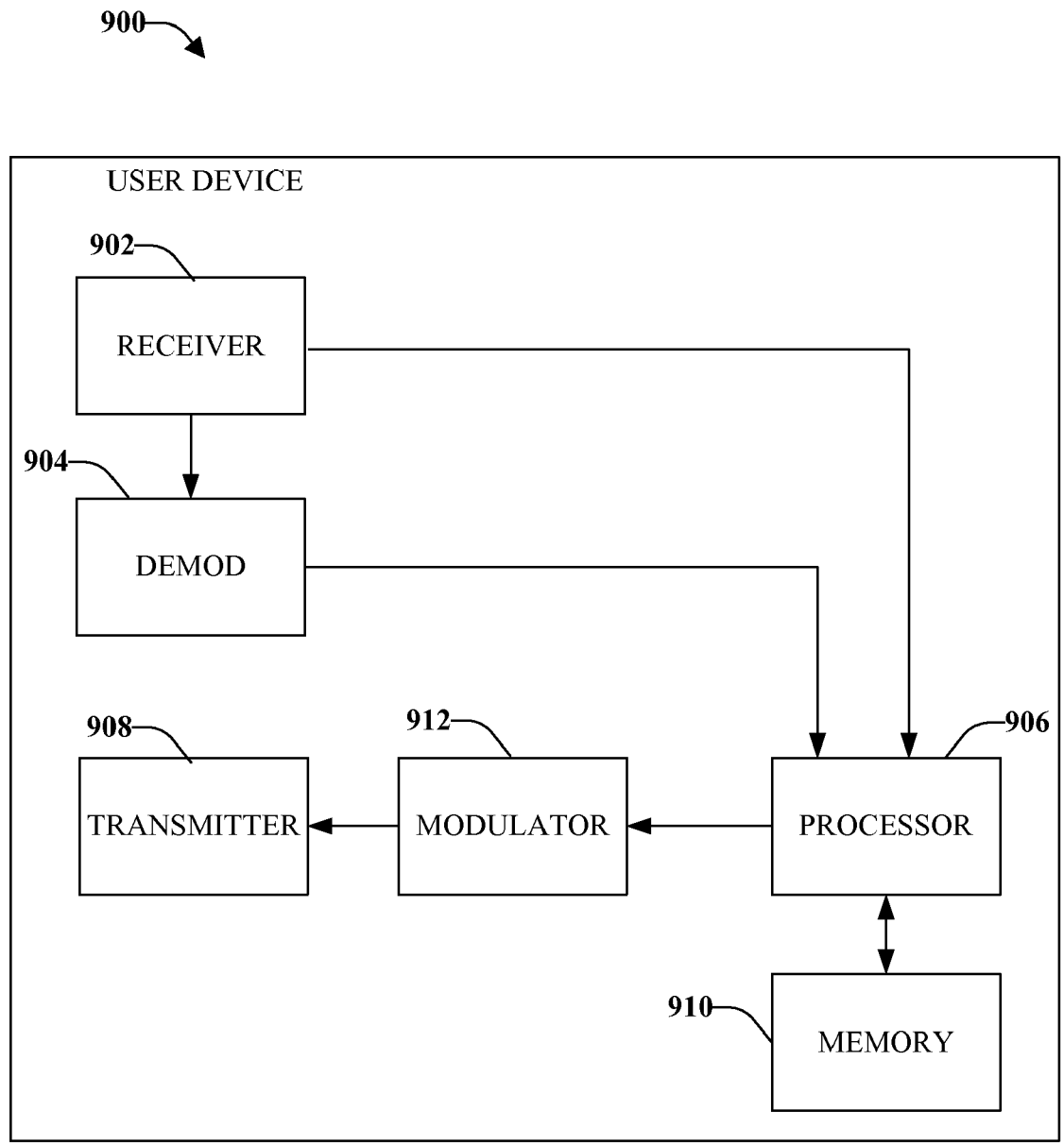
FIG. 9 illustrates a system that facilitates receiving an inter-sector control channel in accordance with one or more of the disclosed aspects.

With reference now to FIG. 9, illustrated is a system 900 that facilitates receiving an inter-sector control channel in accordance with one or more of the disclosed aspects. System 900 can reside in a user device. System 900 comprises a receiver 902 that can receive a signal from, for example, a receiver antenna. The receiver 902 can perform typical actions thereon, such as filtering, amplifying, downconverting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 908 operatively coupled to processor 906 and that can store information related to coordinating communications and any other suitable information. Memory 910 can additionally store protocols associated with sample rearrangement. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 can further comprise a symbol modulator 912 and a transmitter 908 that transmits the modulated signal.

Further, memory 910 can retain instructions related to receiving a control channel from a base station in an adjacent sector, detecting a subset of resources in the received control channel, and identifying a control message included in one resource of the subset of resources. The processor 906 is configured to execute the instructions retained in the memory 910.

Figure 10:
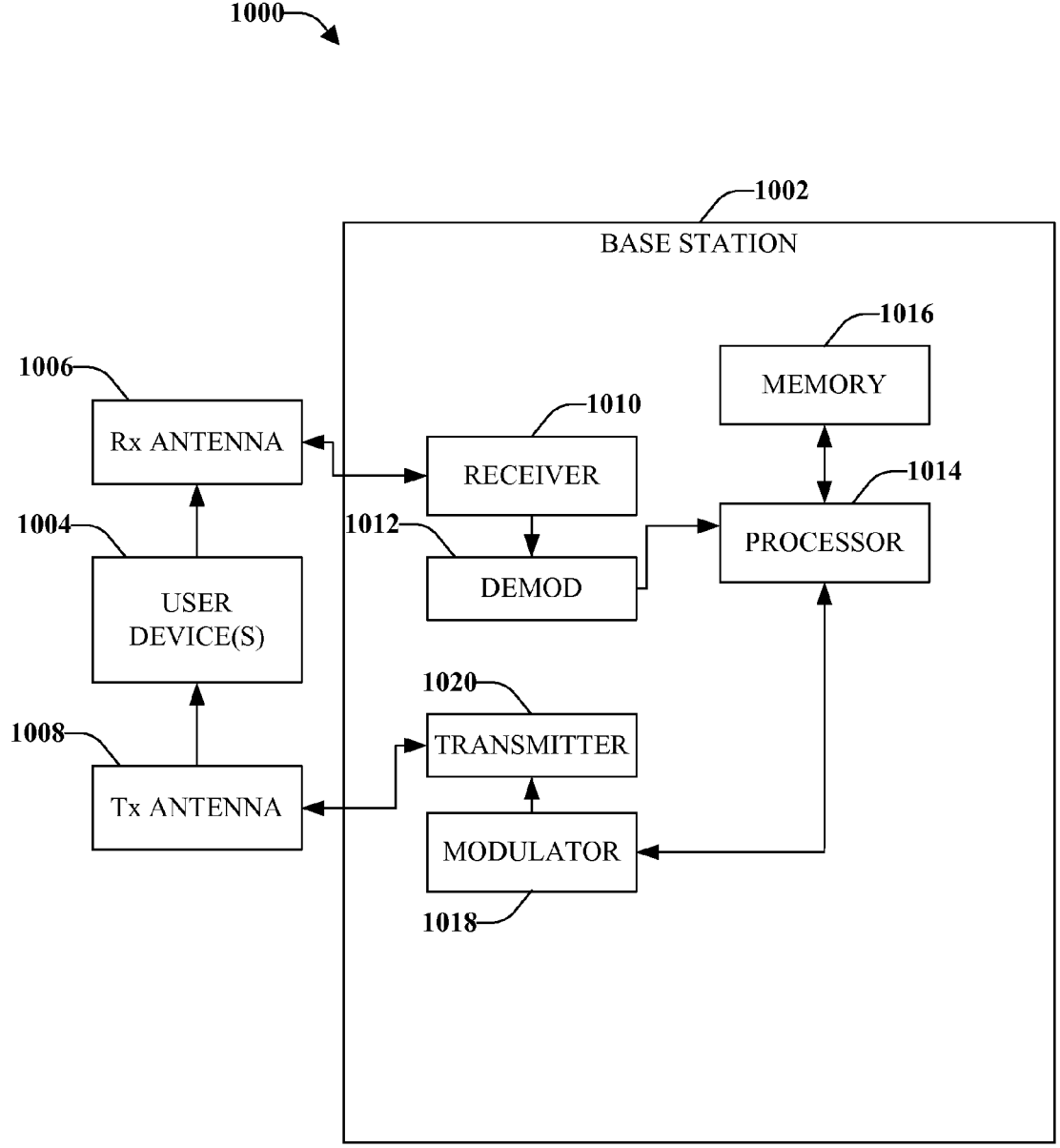
FIG. 10 illustrates a system that facilitates transmitting an inter-sector control channel in accordance with one or more of the disclosed aspects.

FIG. 10 is an illustration of a system 1000 that facilitates transmitting an inter-sector control channel in accordance with one or more of the disclosed aspects. System 1000 comprises a base station or access point 1002. As illustrated, base station 1002 receives signal(s) from one or more user devices 1004 by a receive antenna 1006, and transmits to the one or more user devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016. A modulator 1018 can multiplex the signal for transmission by a transmitter 1020 through transmit antenna 1008 to user devices 1004.

Further, memory 1016 can retain instructions related to dividing a set of control channel resources into two or more portions, placing each of the portions on a reduced reuse pattern or a no reuse pattern, and transmitting a control message during one of the reuse patterns. In accordance with some aspects, memory 1016 can retain instructions related to dividing a set of control channel resources into subsets, selecting one or more of the subsets pseudo-randomly, and transmitting a control channel that includes the selected subset to devices in adjacent sectors. The processor 1014 is configured to execute the instructions retained in the memory 1016.

Figure 11:
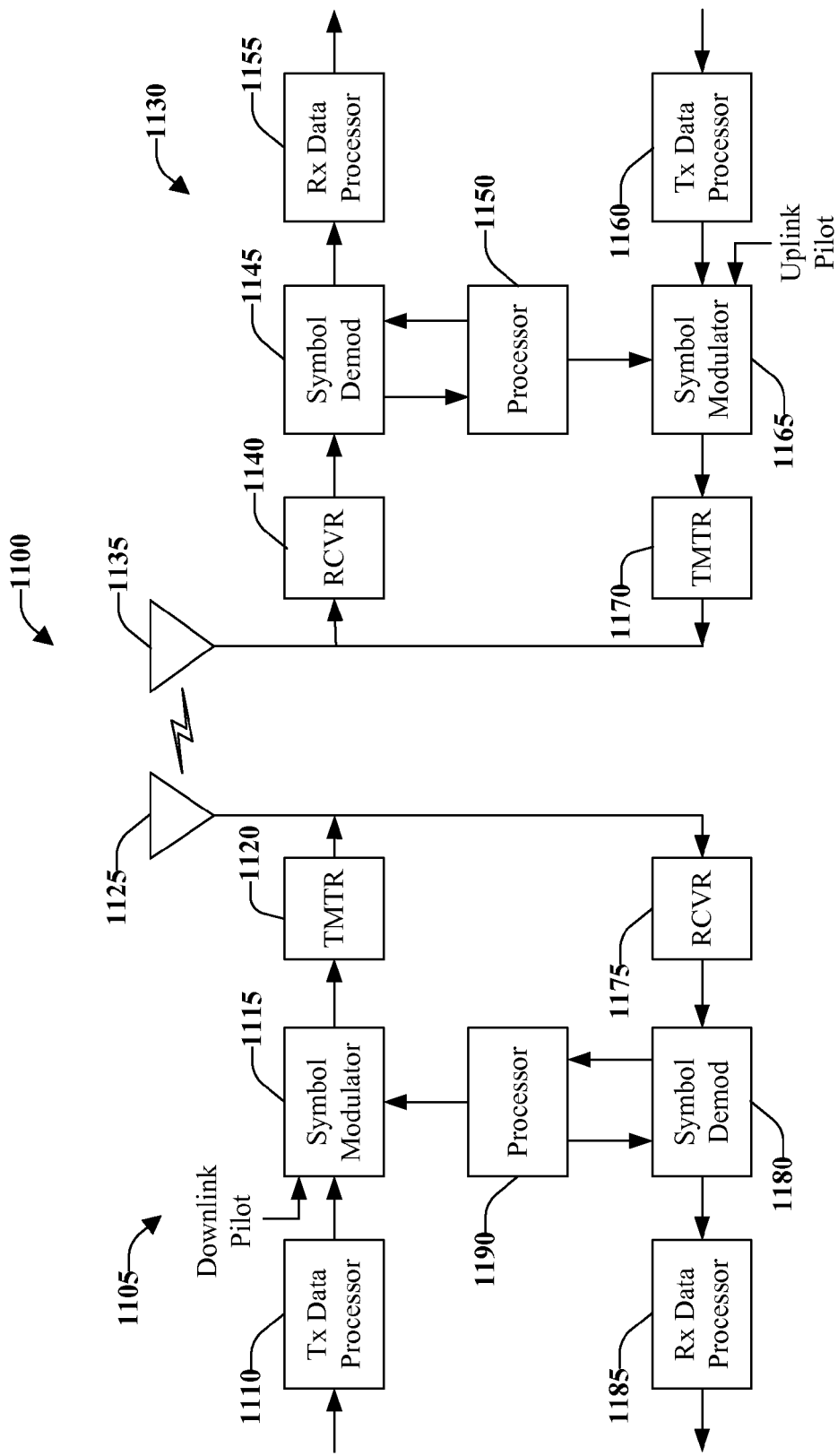
FIG. 11 illustrates an exemplary wireless communication system that can be utilized with the disclosed aspects.

FIG. 11 illustrates an exemplary wireless communication system 1100 that can be utilized with the disclosed aspects.

Wireless communication system 1100 depicts one base station and one terminal for sake of brevity. However, it is to be appreciated that system 1100 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 obtains N received symbols and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink.

Processors 1190 and 1150 direct (e.g., control, coordinate, manage, . . . ) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

Figure 12:
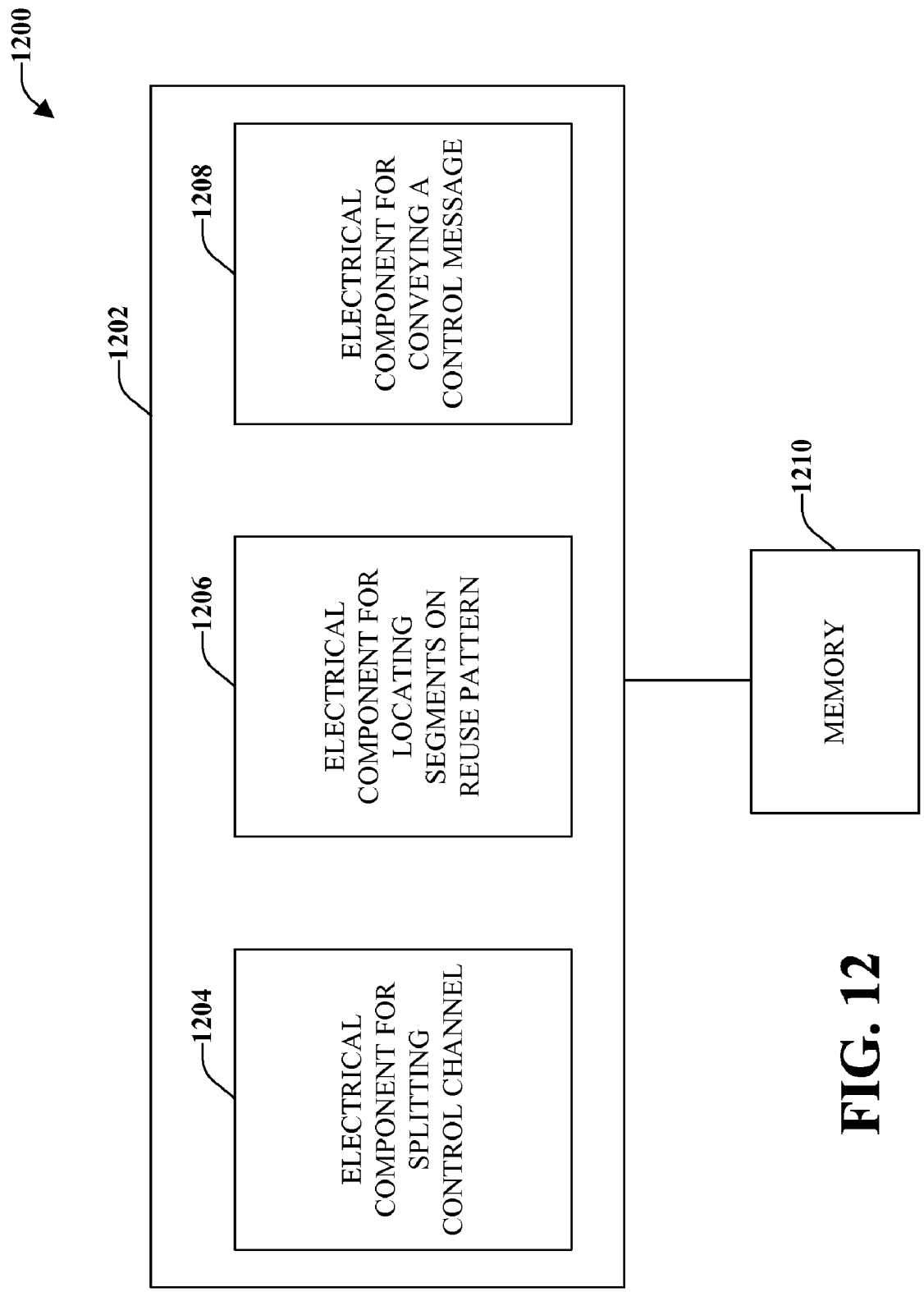
FIG. 12 illustrates an example system that transmits one or more inter-sector control bits.

With reference to FIG. 12, illustrated is an example system 1200 that transmits one or more inter-sector control bits (e.g., a message that includes a number of bits). System 1200 may reside at least partially within a base station. It is to be appreciated that system 1200 is represented as including functional blocks, which may be functional blocks that represent functions implemented by a processor, software, or combination thereof (e.g., firmware).

System 1200 includes a logical grouping 1202 of electrical components that can act separately or in conjunction. Logical grouping 1202 may include an electrical component 1204 for splitting control channel resources into two or more segments. The control channel resources can be one of time, frequency, code space, or power resources. In accordance with some aspects, logical grouping 1202 includes an electrical component for reserving a set of resources before the control channel resources are split into two or more segments.

Also included in logical grouping 1202 is an electrical component 1206 for locating each of the two or more segments on a reduced reuse pattern or no reuse pattern. Each of the two or more segments are located on the reuse pattern to mitigate the occurrence of adjacent sectors utilizing overlapping control resources.

Logical grouping 1202 also includes an electrical component 1208 for conveying the control message to mobile devices in neighboring sectors. The control message can be conveyed utilizing the reduced reuse pattern or the no reuse pattern. The conveyed control message includes pilot symbols and data symbols.

Additionally, system 1200 can include a memory 1210 that retains instructions for executing functions associated with electrical components 1204, 1206, and 1208 or other components. While shown as being external to memory 1210, it is to be understood that one or more of electrical components 1204, 1206, and 1208 may exist within memory 1210.

Figure 13:
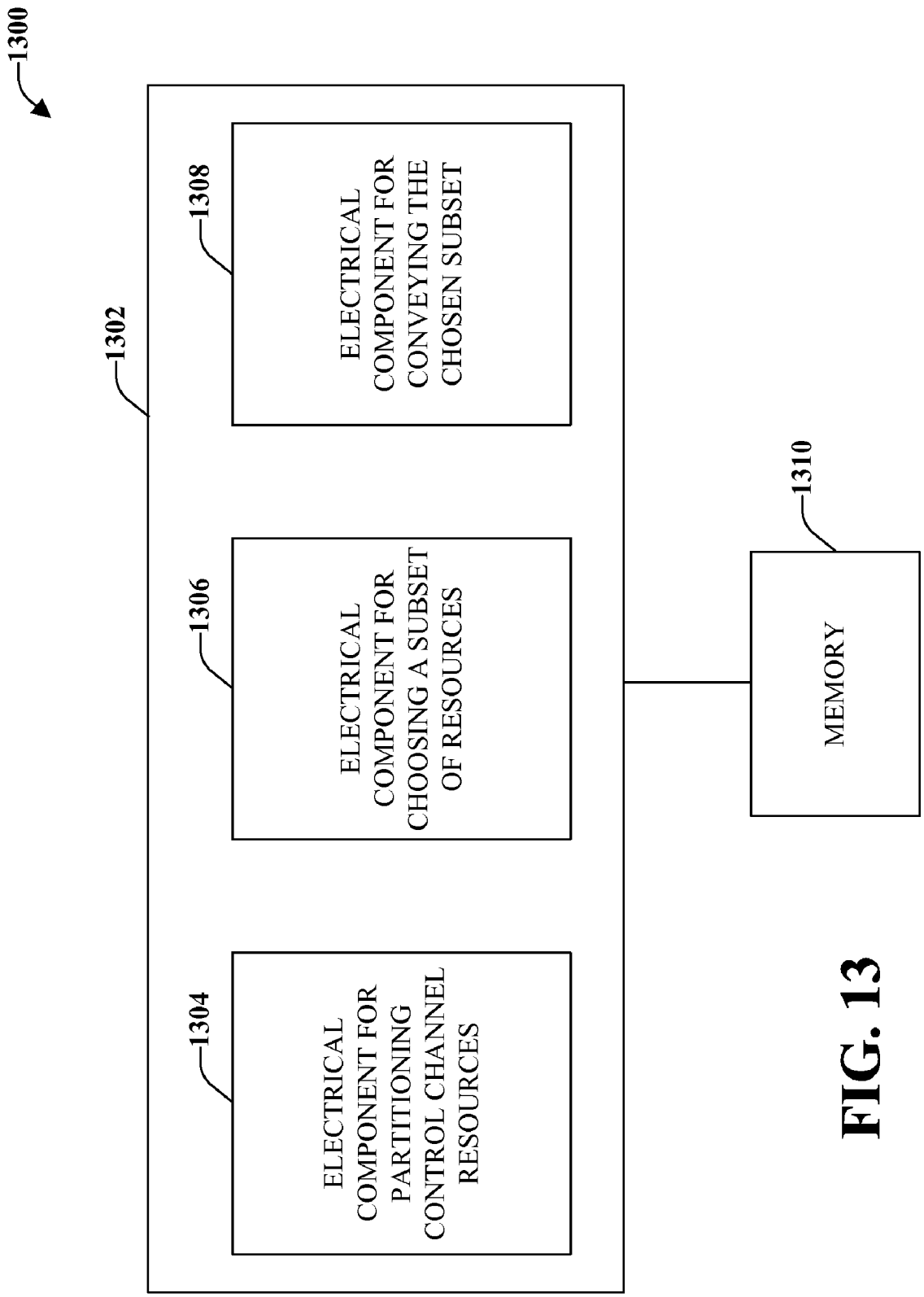
FIG. 13 illustrates an example system that transmits an inter-sector control channel utilizing random statistical averaging.

FIG. 13 illustrates an example system 1300 that transmits an inter-sector control channel utilizing random statistical averaging. System 1300 may reside at least partially within a mobile device. It is to be appreciated that system 1300 is represented as including functional blocks, which may be functional blocks that represent functions implemented by a processor, software, or combination thereof (e.g., firmware).

System 1300 includes a logical grouping 1302 of electrical components that can act separately or in conjunction. Included in logical grouping 1302 is an electrical component 1304 for partitioning a set of control resources into two or more subsets. Each of the subsets can comprise a mixture of pilot symbols and data symbols. The control channel resources comprise time, frequency, code space, or power resources. In accordance with some aspects, logical grouping 1302 includes an electrical component for allocating the set of control channel resources before the control channel resources are partitioned.

Also included in logical grouping 1302 is an electrical component 1306 for choosing at least one of the subsets in a random manner or a pseudo-random manner. The pseudo-random manner can be based on signaling between base stations. The signaling can be over the air or over a backhaul channel. In accordance with some aspects, selecting one of the subsets in a pseudo-random manner is based on a deterministic series of patterns. Additionally or alternatively, selecting one of the subsets in a pseudo-random manner comprises a statistical unplanned reuse. The control channel can be encoded with a redundancy over two or more selected subsets.

Logical grouping 1302 also includes an electrical component 1308 for conveying the chosen subset to devices in adjacent sectors. The chosen subset is included in a control channel.

Additionally, system 1300 can include a memory 1310 that retains instructions for executing functions associated with electrical components 1304, 1306, and 1308 or other components. While shown as being external to memory 1310, it is to be understood that one or more of electrical components 1304, 1306, and 1308 may exist within memory 1310.

Figure 14:
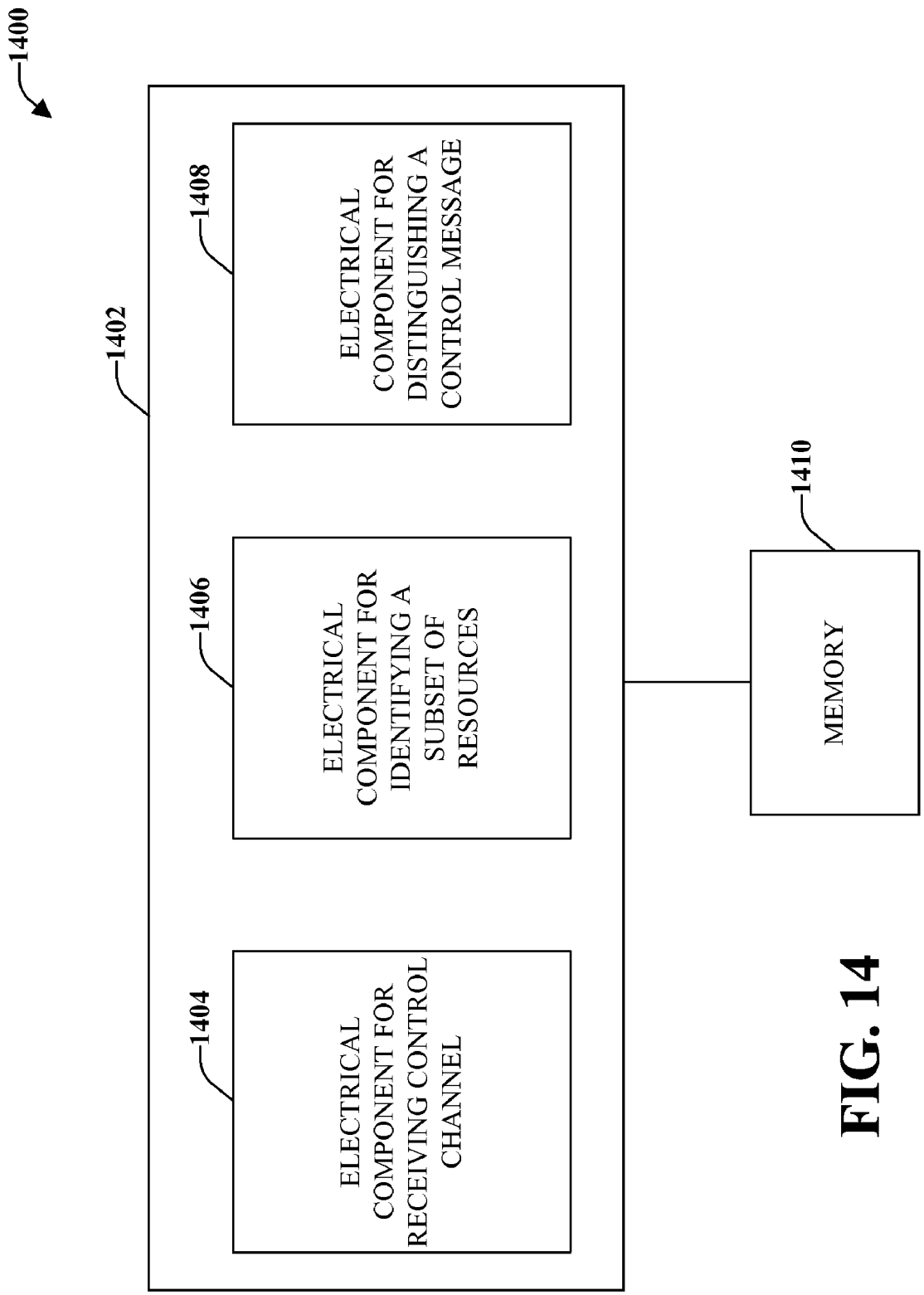
FIG. 14 illustrates an example system that receives an inter-sector control channel transmitted with statistical reuse.

FIG. 14 illustrates an example system 1400 that receives an inter-sector control channel transmitted with statistical reuse. System 1400 may reside at least partially within a mobile device. System 1400 is represented as including functional blocks, which may be functional blocks that represent functions implemented by a processor, software, or combination thereof (e.g., firmware).

System 1400 includes a logical grouping 1402 of electrical components that can act separately or in conjunction. Logical grouping 1402 includes an electrical component 1404 for receiving a control channel sent by a base station in an adjacent sector. Logical grouping 1402 also includes an electrical component 1406 for identifying a subset of resources in the received control channel. The subset of resources can be identified based on knowledge of a pseudo-random sequence. The subset of resources can be a portion of a set of resources allocated for transmission of the control message.

Logical grouping 1402 also includes an electrical component 1408 for distinguishing a control message included in a resource of the subset of resources. Additionally or alternatively, logical grouping 1404 includes an electrical component for receiving two or more subset of resources. Also included can be an electrical component for jointly decoding the subset of resources to obtain a broadcast control message. The joint decoding can be based on pilot symbols in the subsets.

Additionally, system 1400 can include a memory 1410 that retains instructions for executing functions associated with electrical components 1404, 1406, and 1408 or other components. While shown as being external to memory 1410, it is to be understood that one or more of electrical components 1404, 1406, and 1408 may exist within memory 1410.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for transmitting an inter-sector broadcast control channel utilizing random statistical averaging, comprising:
    dividing, on a processor, a set of control channel resources into subsets;
    selecting, on the processor, at least one of the subsets randomly or pseudo-randomly; and
    transmitting, via the processor, a control channel that includes the selected subset to devices in adjacent sectors.

2. The method of claim 1, further comprising:
    allocating, on the processor, the set of control channel resources for transmission of the control channel prior to dividing the set of control channel resources into the subsets.

3. The method of claim 1, wherein the set of control channel resources comprise one or more of time, frequency, code space, or power resources.

4. The method of claim 1, wherein the processor selects the at least one of the subsets pseudo-randomly based on a deterministic series of patterns.

5. The method of claim 4, wherein the deterministic series of patterns is based on one or more of an access point timing, a frame count, or combinations thereof.

6. The method of claim 1, wherein selecting the at least one of the subsets pseudo-randomly comprises a statistical unplanned reuse.

7. The method of claim 1, wherein each of the subsets comprises a mixture of pilot symbols and data symbols.

8. The method of claim 1, wherein the control channel is encoded with a redundancy over two or more selected subsets.

9. The method of claim 1, wherein the pseudo-random selection is a sequence based on signaling between base stations, the signaling is one or more of over the air or over a backhaul channel.

10. At least one processor configured to transmit an inter-sector broadcast control channel utilizing random statistical averaging, comprising:
    a first module for allocating a set of control channel resources;

a second module for dividing the set of control channel resources into two or more subsets;
a third module for selecting at least one of the subsets as a function of a pseudo-random sequence; and
a fourth module for transmitting the selected subset in a control channel to devices in adjacent sectors, wherein the pseudo-random sequence is based on signaling between base stations, the signaling is over the air or over a backhaul channel.

11. A wireless communications apparatus, comprising:
a memory that retains instructions related to receiving a control channel from a base station in an adjacent sector, detecting a subset of resources in the received control channel, and identifying a broadcast control message included in one resource of the subset of resources; and
a processor, coupled to the memory, configured to execute the instructions retained in the memory.

12. The wireless communications apparatus of claim 11, wherein the subset of resources is chosen based on knowledge of a pseudo-random sequence.

13. The wireless communications apparatus of claim 11, wherein the subset of resources are a portion of a set of resources allocated for transmission of the broadcast control message.

14. The wireless communications apparatus of claim 11, the subset of resources comprise one or more of time, frequency, code space, or power resources.

15. The wireless communications apparatus of claim 11, wherein the memory further retains instructions related to receiving two or more subsets of resources and jointly decoding the two or more subset of resources to obtain the broadcast control message, wherein the joint decoding is based on pilot symbols in the two or more subsets of resources.

16. A processor configured to transmit an inter-sector broadcast control channel utilizing random statistical averaging, comprising:
a first module for dividing a set of control channel resources into subsets;
a second module for selecting at least one of the subsets randomly or pseudo-randomly; and
a third module for transmitting a control channel that includes the selected subset to devices in adjacent sectors.

17. A wireless communications apparatus, comprising:
a memory that retains instructions related to dividing a set of control channel resources into subsets, selecting at least one of the subsets randomly or pseudo-randomly, and transmitting a control channel that includes the selected subset to devices in adjacent sectors; and
a processor, coupled to the memory, configured to execute the instructions retained in the memory.

18. A non-transitory computer-readable storage medium storing computer-executable instructions for transmitting an inter-sector broadcast control channel utilizing random statistical averaging, wherein executing the computer-executable instructions on a processor causes the processor to:
divide a set of control channel resources into subsets;
select at least one of the subsets randomly or pseudo-randomly; and
transmit a control channel that includes the selected subset to devices in adjacent sectors.

19. A method for transmitting an inter-sector broadcast control channel utilizing random statistical averaging, comprising:
allocating, on a processor, a set of control channel resources;
dividing, on the processor, the set of control channel resources into two or more subsets;
selecting, on the processor, at least one of the subsets as a function of a pseudo-random sequence; and
transmitting, via the processor, the selected subset in a control channel to devices in adjacent sectors, wherein the pseudo-random sequence is based on signaling between base stations, the signaling is over the air or over a backhaul channel.

20. A wireless communications apparatus, comprising:
allocating a set of control channel resources, dividing the set of control channel resources into two or more subsets, selecting at least one of the subsets as a function of a pseudo-random sequence, and transmitting the selected subset in a control channel to devices in adjacent sectors, wherein the pseudo-random sequence is based on signaling between base stations, the signaling is over the air or over a backhaul channel; and
a processor, coupled to the memory, configured to execute the instructions retained in the memory.

21. A non-transitory computer-readable storage medium storing computer-executable instructions for transmitting an inter-sector broadcast control channel utilizing random statistical averaging, wherein executing the computer-executable instructions on a processor causes the processor to:
allocate a set of control channel resources;
divide the set of control channel resources into two or more subsets;
select at least one of the subsets as a function of a pseudo-random sequence; and
transmit the selected subset in a control channel to devices in adjacent sectors, wherein the pseudo-random sequence is based on signaling between base stations, the signaling is over the air or over a backhaul channel.

22. A method for processing an inter-sector broadcast control channel that utilizes random statistical averaging, comprising:
receiving, at a device, a control channel from a base station in an adjacent sector;
detecting, on the device, a subset of resources in the received control channel; and
identifying, on the device, a broadcast control message included in one resource of the subset of resources.

23. A processor configured to process an inter-sector broadcast control channel that utilizes random statistical averaging, comprising:
a first module for receiving a control channel from a base station in an adjacent sector;
a second module for detecting a subset of resources in the received control channel; and
a third module for identifying a broadcast control message included in one resource of the subset of resources.

24. A non-transitory computer-readable storage medium storing computer-executable instructions for processing an inter-sector broadcast control channel that utilizes random statistical averaging, wherein executing the computer-executable instructions on a processor causes the processor to:
receive a control channel from a base station in an adjacent sector;
detect a subset of resources in the received control channel; and
identify a broadcast control message included in one resource of the subset of resources.

* * * * *